United States Patent
Wynn et al.

(10) Patent No.: US 7,434,211 B2
(45) Date of Patent: Oct. 7, 2008

(54) TRANSIENT SHARED COMPUTER RESOURCE AND SETTINGS CHANGE BUBBLE FOR COMPUTER PROGRAMS

(75) Inventors: Roger H. Wynn, Redmond, WA (US); Michael S. Bernstein, Bothell, WA (US); Kamesh Chander Tumsi Dayakar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 503 days.

(21) Appl. No.: 11/060,100

(22) Filed: Feb. 16, 2005

(65) Prior Publication Data

US 2006/0184828 A1 Aug. 17, 2006

(51) Int. Cl.
*G06F 9/45* (2006.01)
*G06F 11/00* (2006.01)

(52) U.S. Cl. ............... 717/141; 717/145; 717/146; 717/148; 717/161; 714/38

(58) Field of Classification Search ............... 717/141, 717/142–161, 126, 106, 139, 124, 130, 104, 717/108, 136, 137, 138, 169; 714/38
See application file for complete search history.

(56) References Cited

U.S. PATENT DOCUMENTS

| | | | | |
|---|---|---|---|---|
| 5,115,499 | A * | 5/1992 | Stiffler et al. | 711/148 |
| 5,895,494 | A * | 4/1999 | Scalzi et al. | 711/150 |
| 6,154,847 | A * | 11/2000 | Schofield et al. | 714/4 |
| 6,446,057 | B1 * | 9/2002 | Vaughan | 706/46 |
| 6,708,330 | B1 * | 3/2004 | Moberg et al. | 717/158 |
| 7,171,654 | B2 * | 1/2007 | Werme et al. | 717/130 |
| 7,181,743 | B2 * | 2/2007 | Werme et al. | 718/104 |
| 2002/0007389 | A1 * | 1/2002 | Jones et al. | 709/104 |
| 2006/0265698 | A1 * | 11/2006 | Kamen et al. | 717/141 |
| 2007/0067760 | A1 * | 3/2007 | Andrew et al. | 717/143 |

OTHER PUBLICATIONS

A hierarchical processor scheduling policy for multiprocessor systems, Ayachi, S.; Dandamudi, S.P., Parallel and Distributed Processing, 1996. Eighth IEEE Symposium on, Oct. 23-26, 1996, pp. 100-109.*

Proportional share scheduling of operation system services for real-time applications, Jeffay, K.; Donelson Smith, F.; Moorthy, A.; Anderson, J., Real-Time Systems Symposium, 1998. Proceedings., The 19th IEEE, Dec. 2-4, 1998, □□ pp. 480-491.*

(Continued)

*Primary Examiner*—Wei Y. Zhen
*Assistant Examiner*—Satish S Rampuria
(74) *Attorney, Agent, or Firm*—Workman Nydegger

(57) ABSTRACT

Described is a mechanism that preserves the state of computer system shared resources and/or settings, and ensures that changes thereto are reverted when an application exits. A shared resource change bubble logically surrounds application code that causes system resource and/or setting data to change. The bubble preserves existing data before it gets changed, and restores the data when the application program code exits. In one implementation, the bubble is implemented as a library loaded by the application. In an alternative implementation, the bubble is run in a separate process, whereby the bubble can restore changed data even if the application program crashes. In another implementation, a bubble is automatically run for any application that the user has specified needs a bubble. Multiple settings and states may be preserved in a bubble for multiple applications, allowing changes to be undone and reapplied per application, e.g., whenever focus changes.

15 Claims, 6 Drawing Sheets

OTHER PUBLICATIONS

A model of hierarchical real-time virtual resources, Xiang Feng; Mok, A.K., Real-Time Systems Symposium, 2002. RTSS 2002. 23rd IEEE, 2002, pp. 26-35.*

Agreement-based resource management, Czajkowski, K.; Foster, I.; Kesselman, C., Proceedings of the IEEE□□vol. 93 Issue: 3, Mar. 2005, pp. 631-643.*

An OSI-based interoperability architecture for managing hybrid networks, Sugarbroad, I., vol. 28 Issue: 3 Mar. 1990, IEEE, pp. 61-69.*

Program management is always team management, Oliva, L.M., Oct. 21-24, 1990, IEEE, pp. 53-57.*

A method of gathering end-to-end management information, Yong-Hoon Choi; Kil-Hung Lee; Jai-Yong Lee; Sang-Bae Lee, vol. 3, Feb. 15-20, 1998, IEEE, pp. 849-858.*

* cited by examiner

TRANSIENT SHARED COMPUTER RESOURCE AND SETTINGS CHANGE BUBBLE FOR COMPUTER PROGRAMS

FIELD OF THE INVENTION

The invention relates generally to computer systems, and more particularly to computer settings, resources and programs.

BACKGROUND

There are application programs that require temporary changes to system-wide (or at least per-user) computer resources and settings, including components, devices and properties and that are shared among programs. For example, it is common for computer game programs to require a different video resolution from the resolution set for use by other programs, or for presentation applications to disable the screensaver and audio. Such resources and settings are usually configured by the user, or configured by the operating system during setup using default values, and apply to essentially everything that runs within the operating system.

In general, it is undesirable for an application program to override the user's configuration, because the resource states and settings affect everything else running on the system. However there are programs that need to make changes to resources and settings, as well as programs that make changes that the user does not desire. Heretofore, for proper behavior, any process that made a change to a resource state or setting had to be very careful to undo the change, before the process exited. For each application program, this is an on-off operation, and only works as well as the application's implementation of preserving, modifying and restoring any system-wide shared resources and system settings, as required. If the application's implementation does not properly behave or performs poorly, or if the application program crashes, some or all of the changes made are not properly restored, whereby the computer is left in an inconsistent state and/or a state not desirable to the user.

SUMMARY OF THE INVENTION

Briefly, the present invention is directed towards a system and method comprising a generalized mechanism that preserves the state of system-wide shared resources and/or settings, and ensures that the changes are reverted when the application exits. To this end, a shared resource change component, referred to as a bubble, logically surrounds application program code that makes one or more temporary changes to a resource and/or setting. The bubble preserves the state data as it exists before the application program code executes, and restores the resource state when the application program code has finished execution. Any change that is made, whether by the application or by the bubble in response to a request from the application, is thus restored to its previous state. In this way, during initialization for example, an application need only request the change or type of change to be preserved and restored by a bubble, and thereafter need not deal with handling restoration.

In one implementation, the bubble (e.g., implemented as a library) may be loaded by the application, which effectively adds processing to the start and end of the execution of any process that requires changes to shared resources and settings. During the startup or initialization, the bubble preserves the resource state and settings that are to be changed, and makes the requested system change or changes or passes control to the application program to make the change. As the application's process exits, the bubble automatically restores the previous state and settings without further action required by the application.

In an alternative implementation, the bubble may be run in a separate process, whereby the application program need not load a library, but rather requests (e.g., to the operating system) that a bubble be run for it. The bubble is created and preserves the resource state/settings as identified by the application program, before the main application program code executes. The bubble restores the resource state/settings when the application program ends. As a result of running in a separate process, the bubble is able to restore any changes even if the application program crashes or otherwise exits unexpectedly (such as due to a manual termination).

In another alternative implementation, a bubble may be automatically created and run by the operating system for any application that the user has previously or currently specified needs a bubble, e.g., based on experience. The bubble automatically preserves resource state and/or settings based on the type of changes that the user previously or currently indicated that should be undone when this application exits, e.g., to preserve and restore networking settings in the event that the application changes them. The application is launched after automatic preservation occurs, with restoration being similarly automatic when the application program exits.

The bubble can thus take many different forms depending on its usage, and the type of computer system and operating system being used, but in general has a lifetime tied to that of the application/process requesting the system change or changes. For the bubble to make a change, the requested change or changes is passed in by the application to the bubble, which typically is done during initialization of the application/process that needs the change, but may be passed to the bubble at some other time, e.g., as a result of an action initiated within the application such as if a user selects a menu option that requires the system resource change. The bubble may present a user interface (e.g., dialogs or wizards) to have the user help implement the change, or confirm that the change is acceptable. The current state is preserved before the change occurs, such as in a cache in the bubble, in other memory, and possibly serialized to non-volatile storage. Once state is preserved, the application or the bubble acting on the application's behalf can modify the settings or state of one or more system resources (e.g., resource settings, properties, components devices or other shared resources). When the application/process exits, the system resource state is automatically restored from the previously preserved value or values, with restoration essentially requiring no further action on the part of the application or user.

Multiple settings and states may be preserved in a bubble for one application or for multiple applications. This allows different resources and setting changes to be undone and reapplied for each application, such as whenever focus changes to a different application.

Other advantages will become apparent from the following detailed description when taken in conjunction with the drawings, in which:

DETAILED DESCRIPTION

Exemplary Operating Environment

Figure 1:
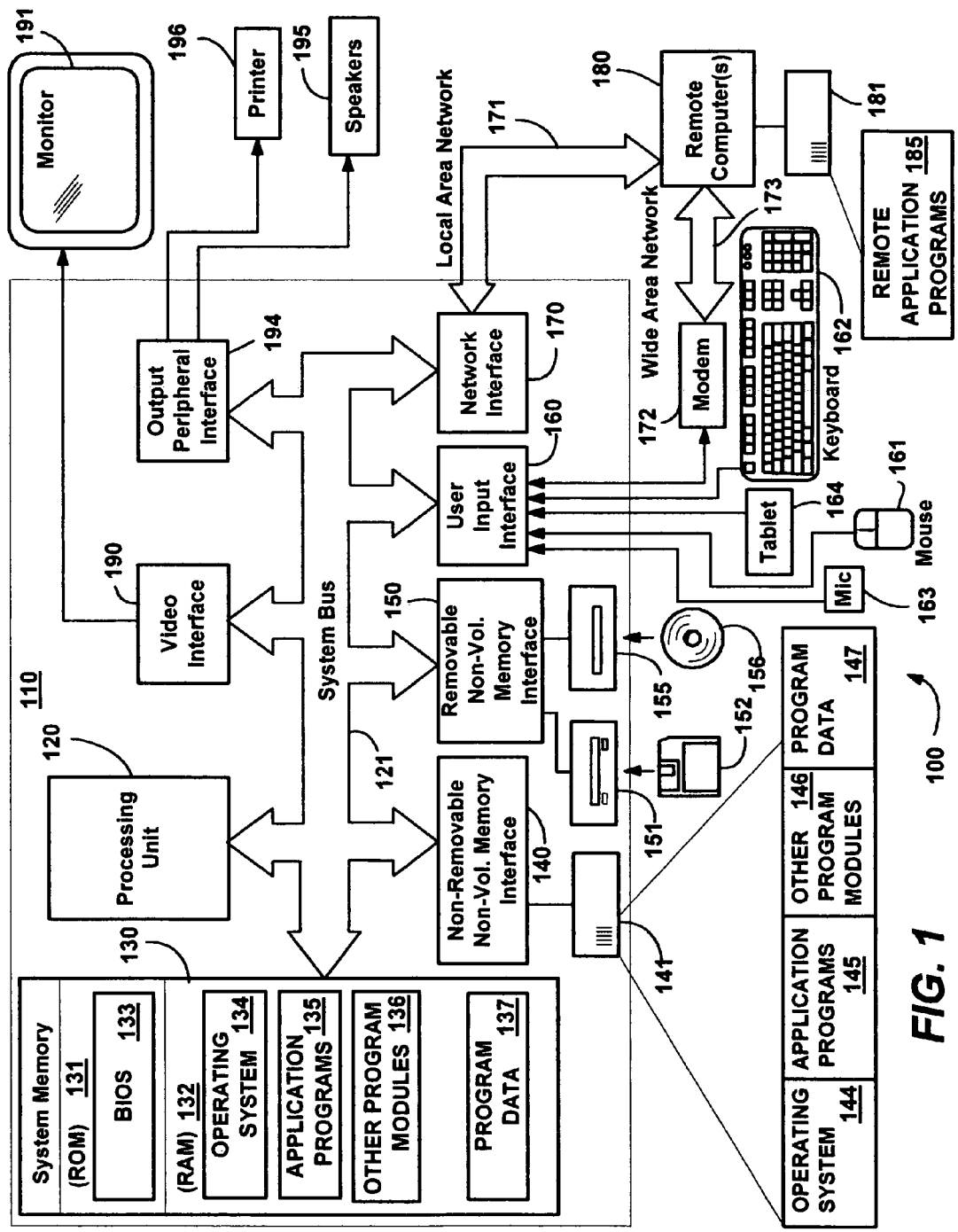
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Transient Shared Resource Change Bubble

The present invention is generally directed towards a system and method by which the state of system resources and settings are preserved, temporarily changed for use by an application program or the like, and then restored, in a controlled manner. For example, network connections/settings may be changed for one program, used by that program, and then restored when the program exits, essentially acting as a bubble around the main application program code that sets a transient operating context for the application. As will be understood, this is accomplished by other code, of a shared resource change component referred to as a bubble, that is not part of the application program itself, but rather is provided in a library (e.g., dynamic link library, or DLL), or by an operating system service or other component, such as an independent executable. As a result of being external to the application program, the bubble's operating behavior with respect to preservation and restoration is consistent across virtually any type of application program, and may be used with virtually any type of system resources and/or system settings.

As also will be understood, there are many kinds of shared settings and resources that a bubble can preserve and restore in accordance with the present invention. Thus, although a number of examples of what bubbles can preserve and restore are mentioned herein, including network/modem connectivity settings and states, display settings, printer settings, registry settings, file system state, desktop state, system tray state, keyboard mapping, open ports, system operating modes (e.g., presentation, meeting, home, and so forth), language, privilege level, power management states, and encryption settings, there are many other examples. Some other examples of such resources and settings that may be temporarily changed by an application program include brightness, volume, refresh rate, power settings, mouse sensitivity, display settings, screensaver deactivation, deactivating notifications, firewall deactivation, Bluetooth activation, the programs that appear on the start menu, and many others. As such, any of the examples mentioned herein are non-limiting.

Moreover, numerous ways to implement the present invention are feasible, and only some of the alternatives are described herein. For example, the bubble that provides the operating context for an application program may be controlled by the application program, or the bubble may exist without the application program having any knowledge of its existence. Similarly, the user may define a bubble that sets the operating context for an application program, or the bubble may exist programmatically, without any user knowledge or intervention. As such, the present invention is not limited to any particular examples used herein, but rather may be used various ways that provide benefits and advantages in computing in general.

Figure 2:
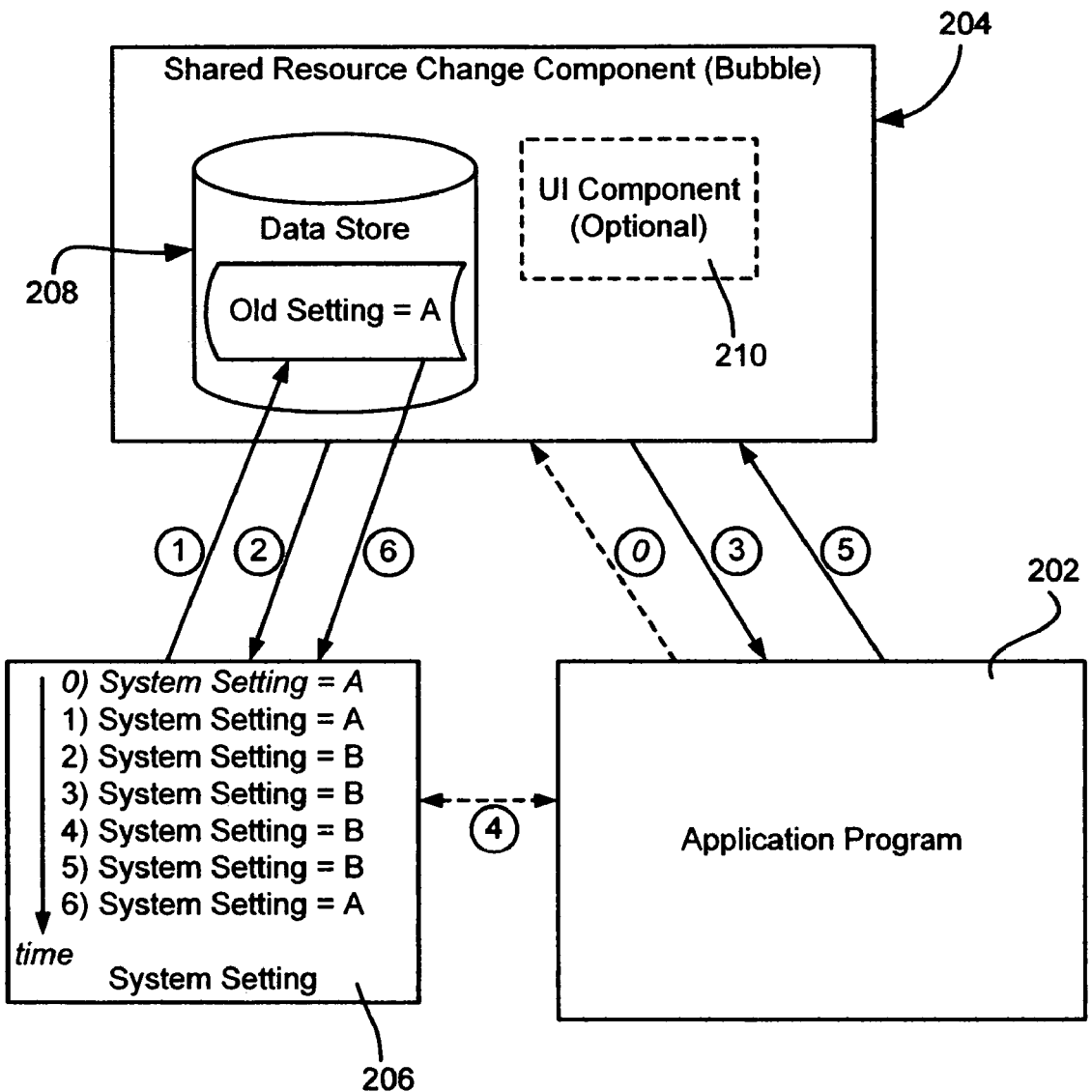
FIG. 2 is a block diagram generally representing the concept of a bubble for preserving state and/or settings of a shared system resource to be changed, and restoring the state and or settings, in accordance with various aspects of the present invention.

FIG. 2 shows a general example describing the concept of a bubble. In FIG. 2, an application program 202 is run within the operating context of a shared resource change component, referred to as a bubble 204. Various ways for this to occur are described with reference to FIGS. 3-5, but in general, the bubble knows before any change is made to any system resource state(s) and/or setting(s), what system resource state(s) and/or setting(s) to preserve. As represented in FIG. 2 by the arrow labeled with circled numeral zero (0), the application 202 may create the bubble 204 and instruct it as to what resource state and/or settings to preserve. For example, the application program 202 may instantiate an object as the bubble 204, and call the object on an interface with parameters describing what settings to preserve. Later the application 202 may call the bubble object and instruct the bubble to restore the settings; the bubble may also detect the application closing, and restore the preserved data without application program input. Alternatively, the operating system may launch the application program in the operating context of a bubble, without the application program being aware of the bubble's existence.

For simplicity and brevity, in the examples of FIG. 2-5, the resource state and/or settings to preserve and restore are referred to as a "system setting" having a value represented by an alphabetic character that is read for preservation, written as a changed value to a current setting, and written back upon restoration. However, it should be understood that although for some application programs there may be as little as one setting that is changed, for another application there may be any combination of resource states and/or settings that the bubble preserves and restores, and the resource states and/or settings need not be related to one another except by inclusion in the same bubble. For example, a game program may be associated with a bubble that preserves, changes and later restores the screen resolution, essentially one system setting, while a networking-related program may change multiple system settings and resource states, including, for example, networking-related data that changes network connectivity, and video-related data to visually indicate the change to the networking settings. The concept of a "System Setting" in FIGS. 2-5 is representative of any such usage.

In operation, once the bubble 204 knows the system settings and resource states to work with, in this example the system setting in block 206, the bubble locates the setting, reads its value, and preserves the value in a data store 208 as the old setting to later restore, as represented in FIG. 2 by the arrow labeled one (1). Note that in FIG. 2, the numbers accompanying the value of the system setting listed over time correspond to the numbers of the labeled arrows, and thus the value at the time that the bubble reads the data into storage, corresponding to the arrow labeled one (1), is "A" as shown in block 206.

With respect to locating and preserving the old data, if aware of the bubble 204, the application program 202 can assist in identifying the type of data that is to be changed and/or its location. However one aspect of the present invention is directed towards removing this responsibility from the application, ensuring that data is consistently preserved and restored; at present, there is no consistency among application programs, many of which behave poorly when attempting such operations. Thus, where possible, it is generally better for the bubble to handle preservation-related operations.

Once located and read, the settings/resource data may be stored anywhere by the bubble that it can access, such as in memory allocated to the bubble's process. The bubble may even serialize the restore data to non-volatile storage so that, for example, restoration will automatically occur on the next reboot in the event that the system crashes, or if the application program crashes and the bubble is running in the application program's process (as in the alternative described below with reference to FIG. 4).

With respect to obtaining the new data, it is feasible for the user to be involved, as represented in FIG. 2 by the optional user interface (UI) component 210. For example, as part of changing networking settings, the user may be provided with a wizard or the like that obtains information from the user for configuring the new settings and/or confirming the change. Alternatively (or in addition to), the user may be asked what settings and/or states to preserve, or even whether to have a bubble at all this particular time. For example, a user interface can provide a dialog to enable a user to selectively decide whether to run a particular application program with file system-based encryption active, depending on what the user is working on at the time, and then if selected, turn encryption off when the application closes. The user need not know that a bubble exists, only that a dialog is provided when that particular application launches, and that if selected, file system-based encryption is turned off when the application closes. The user interface can also be used to resolve conflicts, e.g., when two or more applications want the same setting to have different transient values.

Regardless of how the change data was obtained, e.g., programmatically read in, via user interface, or both, once the old data is preserved the bubble 204 applies (e.g., writes) the new data to the appropriate location or locations. This is represented in FIG. 2 via the arrow labeled two (2), and in block 206 by the change from value "A" to value "B" in the system setting. Note that again, while it is feasible for the bubble to preserve the data and thereafter let the application program make the change, it is often desirable that the bubble do so whenever possible, to ensure consistency in behavior across applications. Some types of bubbles are designed primarily to undo a program's changes, however, such as those that essentially surround an application to undo changes to registry settings, to the desktop, to the file system, and so on. The application program may make such changes any time it wants, not just as part of initialization. Thus, a bubble to undo such changes is designed for preservation and restoration, and may let the application program make whatever changes it wants, with the bubble restoring the prior state as soon as the application program ends.

Once the data is preserved, the bubble 204 then takes some action, e.g., informs the application program of the change, or otherwise causes execution to return to the application code, as represented in FIG. 2 via the arrow labeled three (3). At this time the application is running with the new system setting.

Depending on the type of setting, the application program may or may not need access to the setting's value. For example, an application program that uses a bubble to change screen color depth likely has no need to read the data, whereas a bubble that surrounds an application to preserve and restore the registry assumes that the application program will both read values from and write values to the registry. Access to the setting is represented in FIG. 4 by the arrow labeled four (4), shown as a dashed arrow because the application may or may not access the setting.

Figure 4:
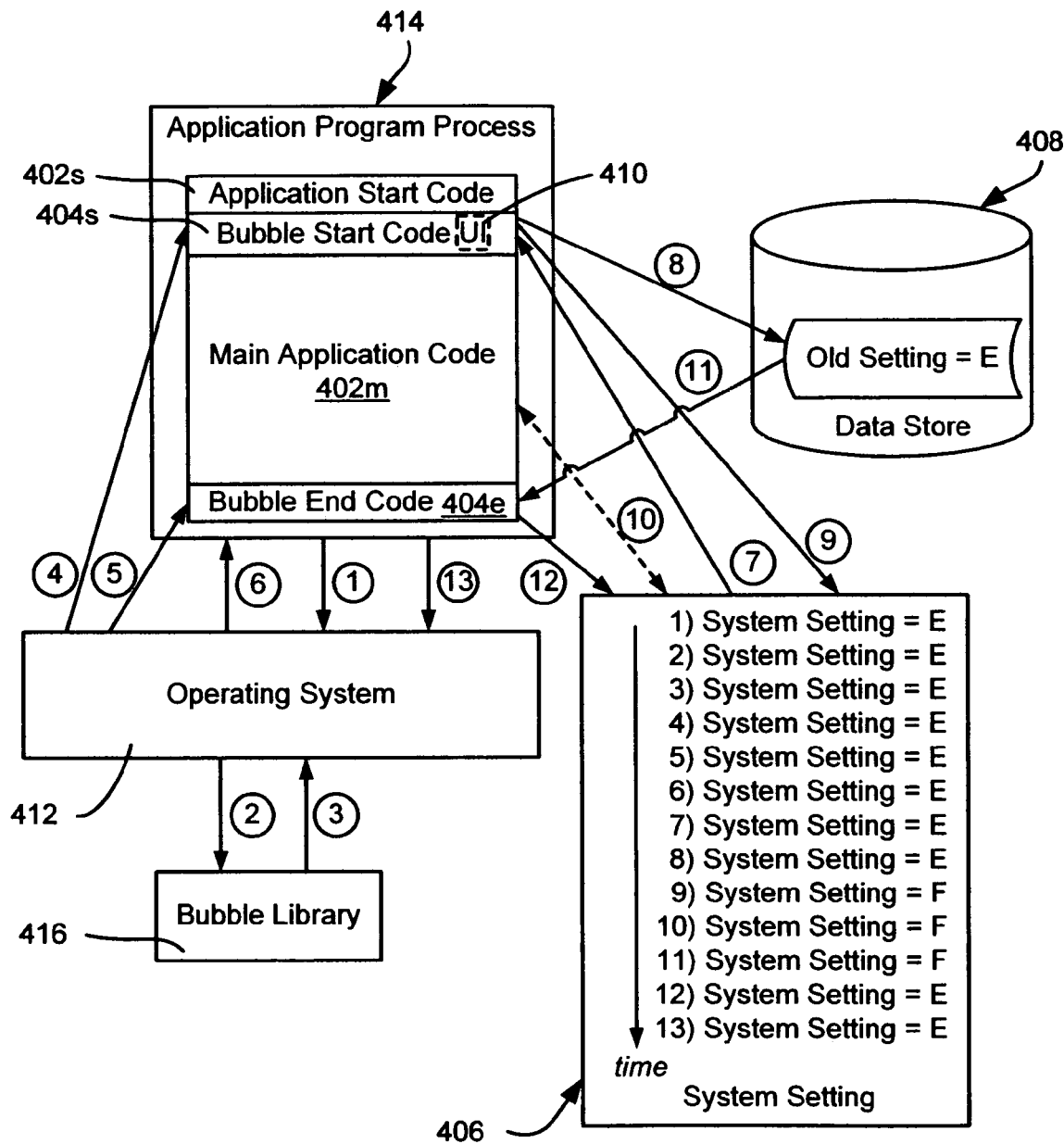
FIG. 4 is a block diagram generally representing a bubble for preserving and restoring system state and/or settings in accordance with various aspects of the present invention, in which the bubble runs in a process space of the application program.

At some later time, the application program 202 will indicate to the bubble 204, directly or indirectly, that restoration is to occur, as represented in FIG. 4 by the arrow labeled five (5). This may be at any time the application program 202 desires, but typically will be just prior to closing. Alternatively, if the bubble is in a different process from that of the application program, the operating system can instruct the bubble 204 to restore the settings from the data store 208, such as upon the application program closing or being manually terminated (e.g., after crashing). Restoration is represented in FIG. 2 via the arrow labeled six (6), and by the change from value "B" back to the value "A" in the system setting block 206.

Figure 3:
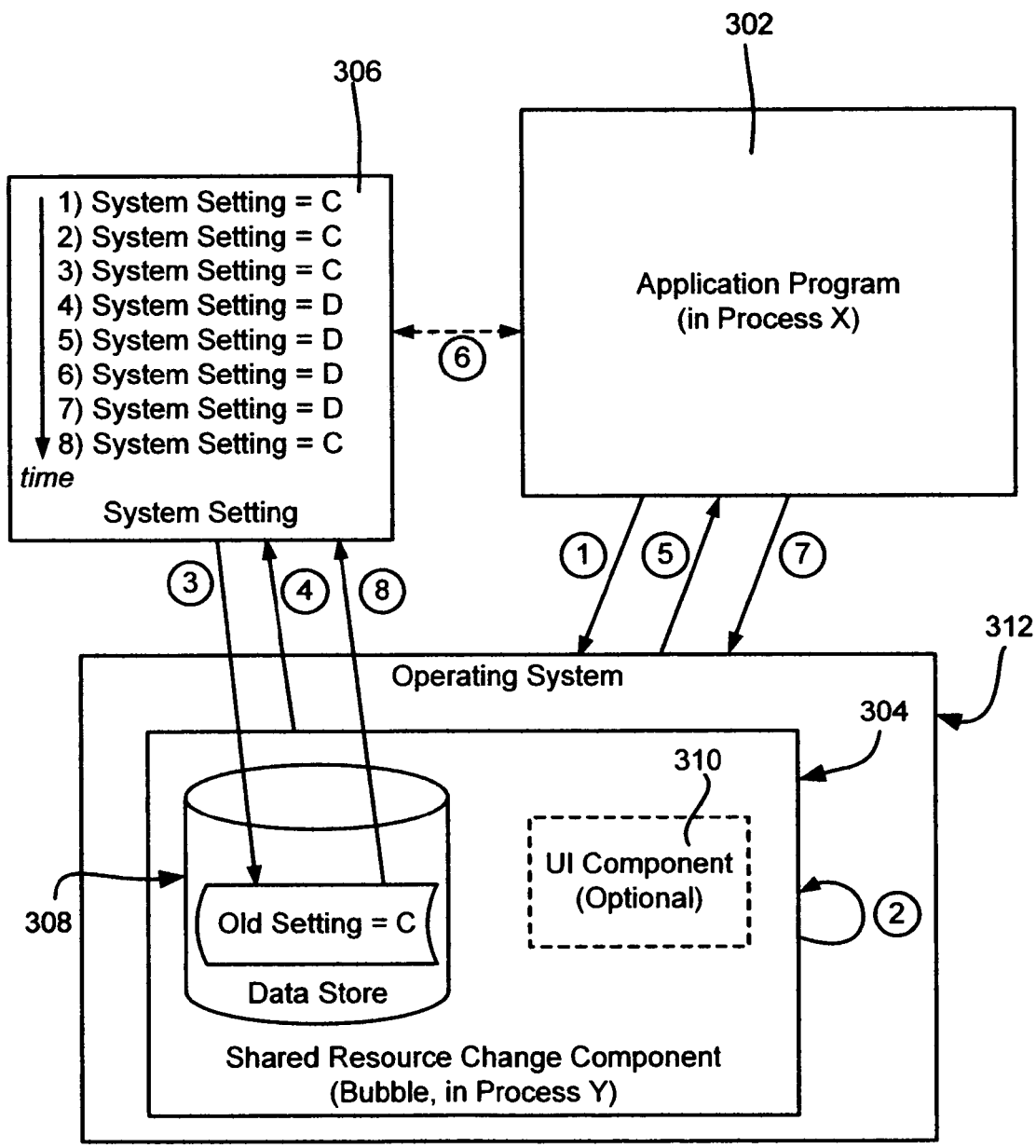
FIG. 3 is a block diagram generally representing a bubble for preserving and restoring system state and/or settings in accordance with various aspects of the present invention, in which the bubble runs in a separate process from a process of the application program.

FIG. 3 represents one alternative way of using a bubble, in an implementation which the application program 302 requests that the operating system 312 provide it with a bubble 304, and the bubble 304 runs in a different process space (process Y) from the process space (process X) of the application program 302. The request, which may be made via an API call or the like, and creation of the bubble 304, which may comprise instantiating a bubble object, starting or calling a service, and so on, are represented in FIG. 3 via the arrows labeled one (1) and two (2).

As is common to the bubble implementations described herein, the bubble 304 knows what set of data to preserve, such as using information provided as parameters with an API call to the operating system, (e.g., provide a bubble for printer settings), and locates, reads and stores the appropriate settings. Preservation is represented in FIG. 3 via the arrow labeled three (3), which in this example writes the value of "C" as the "old" setting in the data store 308. The change is then made, if the data to change is known to the bubble 304, as represented in FIG. 3 via the arrow labeled four (4) and by the change from value "C" to the value "D" in the system setting block 306. Otherwise the application program 302 will make the change (or changes) at whatever appropriate time (or times) it desires. Note that while running, the application program 302 can make multiple changes to the same setting; the concept of a bubble will restore the setting to the value it had before the application first changed it, regardless of how many other times the application program changes the value.

After the bubble 304 preserves the old setting ("C") and possibly changes the current system setting in block 306 to a new value, the arrow labeled five (5) represents the return of control to the application program 302, which will run in the operating context of any new setting. The operating context is immediate if the bubble 304 makes the change, or if not, exists whenever the application program first makes a change. The application program 302 may or may not access the system setting as described above, as represented in FIG. 3 by the dashed arrow labeled six (6).

At a later time, the application will close, typically under its own control, as represented in FIG. 3 by the dashed arrow labeled seven (7), essentially by informing the operating system 312 that it should be closed, or by being terminated by the operating system 312, such as if the application crashed or the user requested its termination (e.g., via a task manager program or the like). Note that the application has a process handle that is known to the bubble (e.g., provided to the bubble by the operating system) so that the bubble knows the application program has exited, without requiring any exit notification from the application. At this time, the bubble 304 restores the old setting, as represented in FIG. 3 via the arrow labeled eight (8) and by the change from value "D" back to the value "C" in the system setting block 306.

Note that one advantage to such an implementation in which the bubble 304 runs in a separate process from the process of the application program 302 is that the bubble 304 can restore the setting if the application 302 does not behave properly with respect to requesting restoration, e.g., because it crashed or was manually terminated. Another advantage is that any conflicts between application programs requesting different settings may be resolved in the bubble/operating system, rather than having a condition in which one application A makes one change in its process (which also contains A's bubble), another application B makes another change in its process (which also contains B's bubble), and so on, e.g., a last-writer wins scenario causing the earlier-changing program to operate in another operating context from that which was requested, creating a potentially unstable computer system.

Notwithstanding, running a bubble in the same process space as the application code may be valuable in some scenarios. For example, consider a game program where the application program changes a video setting and exclusively writes to the display in a full screen mode. As there is no windowing and no other application program is writing to the display, there is no video resolution conflict. Also, if there is any program crash, the setting is easily reset. As will be understood, very little change to the program code is needed to load a bubble.

FIG. 4 shows such an alternative implementation having the bubble code 404 (comprising parts 404s and 404e) run in the application program's process space 414. In general, the application program 402 (comprising parts 402s and 402m) includes some small amount of start code 402s that calls into the operating system 412 to load the bubble code, e.g., maintained in the form of a dynamic link library (DLL) 416 or the like. The request is represented in FIG. 4 via the arrow labeled one (1), with the locating of the library 416 (which may require a call to the file system) represented in FIG. 4 via the arrows labeled two (2) and three (3).

When the bubble code is loaded, represented in FIG. 4 via the arrows labeled four (4) and five (5), the bubble code includes start code 404s and end code 404e that essentially surrounds the main application code 402m. In actuality, the program's start code 402s will jump to the bubble start code 404s, and the program's main code 402m will jump or otherwise transfer execution to the bubble end code 404e, such as via function calls to the library code, however in FIG. 4 the bubble start code 404s and bubble end code 404e are shown as surrounding the application code linearly, to emphasize the concept of a surrounding bubble and to depict the ordering of the flow of execution within the process space 414. In any event, after loading, the operating system returns control to the application program start code 402s, which in turn passes control to the bubble start code 404s.

As generally described herein with respect to the various alternative implementations, the bubble start code preserves the appropriate system setting, by reading the value of "E" in this example, and writing the value to the data store 408, as represented in FIG. 4 via the arrows labeled seven (7) and eight (8). A user interface component 410 may be within the bubble start code 404s to obtain the change data or other information as described above; in any event, once known, the arrow labeled nine (9) represents the change being made, although as described above, the application program's main code 402m may make the change (the dashed arrow labeled ten (10)) rather than the bubble start code 404s.

When the main application program 402m completes, or at some other time when the main application program 402m wants the previous setting restored, control transfers to the bubble end code 404e. In keeping with the present invention, the bubble end code 404e reads the data store 408 (arrow eleven (11)) and restores the value of the old setting back to "E" as the current value in the system setting block 406 (arrow twelve (12)). Arrow thirteen (13) represents the program/bubble code closing; there may be application end code (not shown) to perform the close operations.

As can be readily appreciated, not all application programs (e.g., legacy applications) are written to request a bubble, or an application may use a bubble to some extent (likely unknown to the user) but does not restore everything the user wants restored. Further, certain application programs may change settings and/or state, whether intentionally or unintentionally, which the user wishes to undo. For example, even though applications should not do so, some applications add a shortcut icon to the desktop and/or system tray (if not already present) whenever they run. Still other applications continue running processes after the application is closed. Such behavior is annoying and inconvenient to many users, and may waste resources.

Thus, the user may want or need to run such an application program with bubble-like restoration of the present invention, so that some change that the application program makes is properly undone. As should be understood, a bubble, specified by the user and independent of the application program, can eliminate such problems. Note that a bubble can surround another bubble, e.g., if the application program uses a bubble that performs preservation and restoration of some settings and/or resource state, but the bubble does not preserve and restore everything that the user would like to reinstate, the user can request that the application be run in a bubble, even though it already is run in a different bubble.

Figure 5:
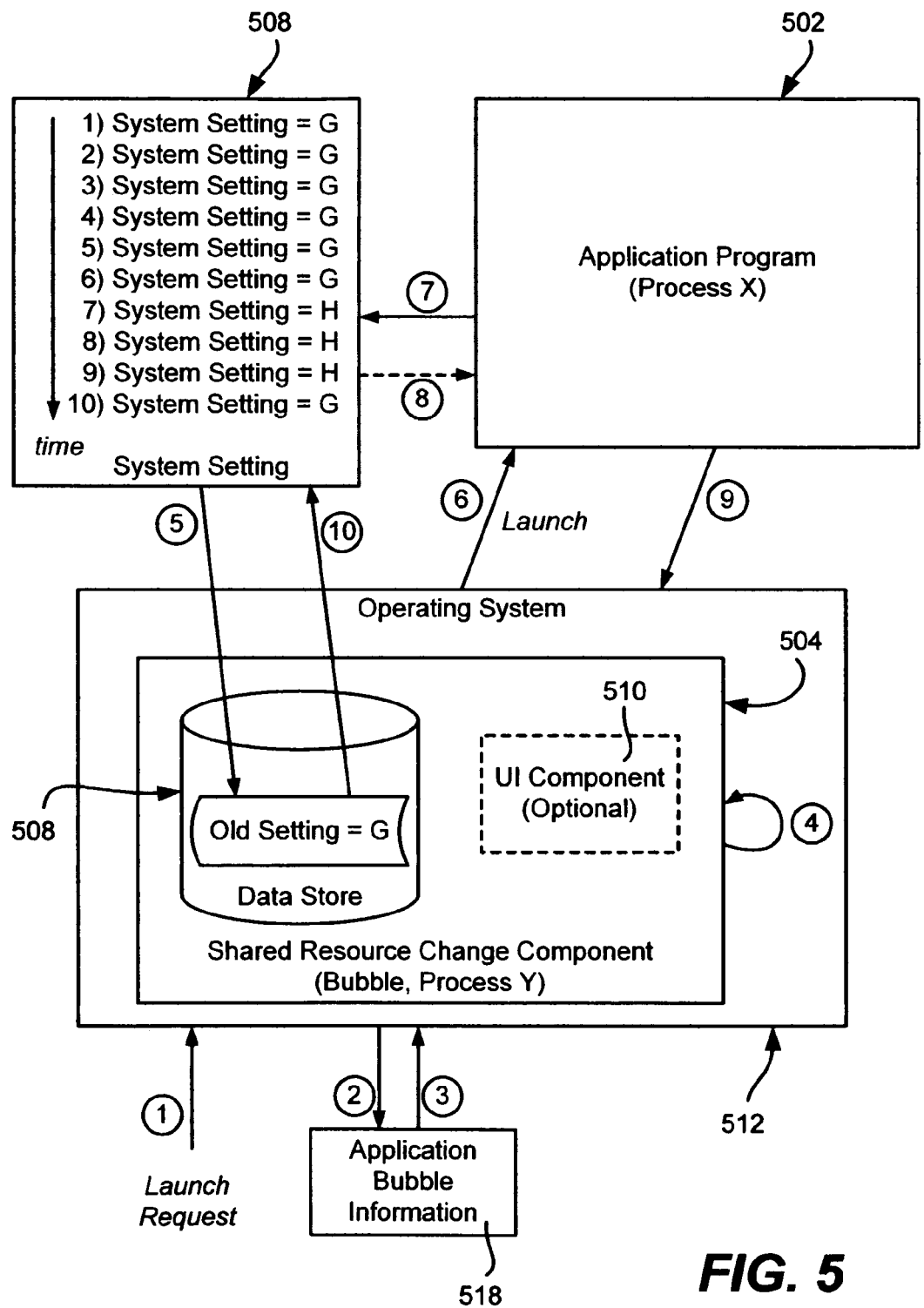
FIG. 5 is a block diagram generally representing a bubble automatically generated by an operating system at program launch for preserving and restoring system state and/or settings that may be changed by an application program, in accordance with various aspects of the present invention.

FIG. 5 is an example implementation of a user-controlled bubble 504, such as a third-party written bubble that the user instructs the operating system 512 to automatically associate with a given program whenever that program is launched. Note that the user may set up such a bubble association once via a utility program, via a control panel item, and so forth, or may selectively request an association with each launch, such as by right-clicking on the application program (or its shortcut) and selecting "run in bubble" or the like. Using a program user interface such as having checkboxes or the like, the user may select types of state to preserve/restore, e.g., desktop state (at least with respect to shortcuts), running process state, file system state, system tray state, networking state, registry state, encryption state, and so forth, while leaving unchecked any boxes for changes made that the user allows to remain. Thus, in the above example, the user may want the desktop restored, but not want to restore the file system state so that any other files that are created/written during program execution are not lost.

As can be seen in the example implementation of FIG. 5, when a launch request is received (the arrow labeled one (1)), the operating system 512 checks whether there is bubble information 518 associated with the application program 502 to be launched. This is represented in FIG. 5 via the arrows labeled two (2) and three (3). If so, the operating system 512 creates a bubble 504, (arrow four (4)), which in turn reads and preserves the system setting according to the information 518, e.g., as pre-identified by the user via the checkboxes or the like. This preservation step is represented in FIG. 5 via the arrow labeled five (5).

When the bubble 504 informs the operating system 512 that the appropriate data is preserved, the operating system 512 launches the application program 502, as represented by the arrow labeled six (6). Note that the application program 502 need not have any knowledge of the bubble's existence, and may in fact request its own separate bubble, which, if present, will be essentially surrounded by the bubble 504.

The application program 502 may access the system settings, including making whatever changes it wants, as represented in FIG. 5 via the arrows labeled seven (7) and eight (8). Note that a solid arrow is shown as arrow seven (7) to represent that a change is made at least sometimes by the application, otherwise the user probably would not have requested a bubble around the program.

In any event, when the application 502 ends, on its own or otherwise terminated, the operating system 512 recognizes the end (the arrow labeled nine (9)), along with the need to restore the old setting back to the system setting. Note that because of the separate processes, crashing of the application does not prevent restoration. Because the program 502 ended, the operating system 512 instructs the bubble 504 to restore the changed setting, from "H" back to "G" in the example of FIG. 5, which the bubble 504 does as represented via the arrow labeled ten (10). The bubble 504 may then close on its own or be cleaned up by the operating system 512. As can be readily appreciated, in the desktop icon example, the icon will only appear on the desktop between the time the application program 502 wrote the icon and the time the application program 502 closes and the bubble 504 restores the previous desktop appearance.

Along with the concepts of application state change (e.g., exiting) triggering restoration, and having a bubble within a bubble, is the feasibility of multiple sets of settings and/or state for multiple application programs within a bubble. For example, as the operating system changes focus to a new application program window, (or even if a mouse hovers over a new window), certain settings may be changed for or by that particular application program based on this different type of application program state change. When that application program loses focus, any of its changes are reverted.

Figure 6:
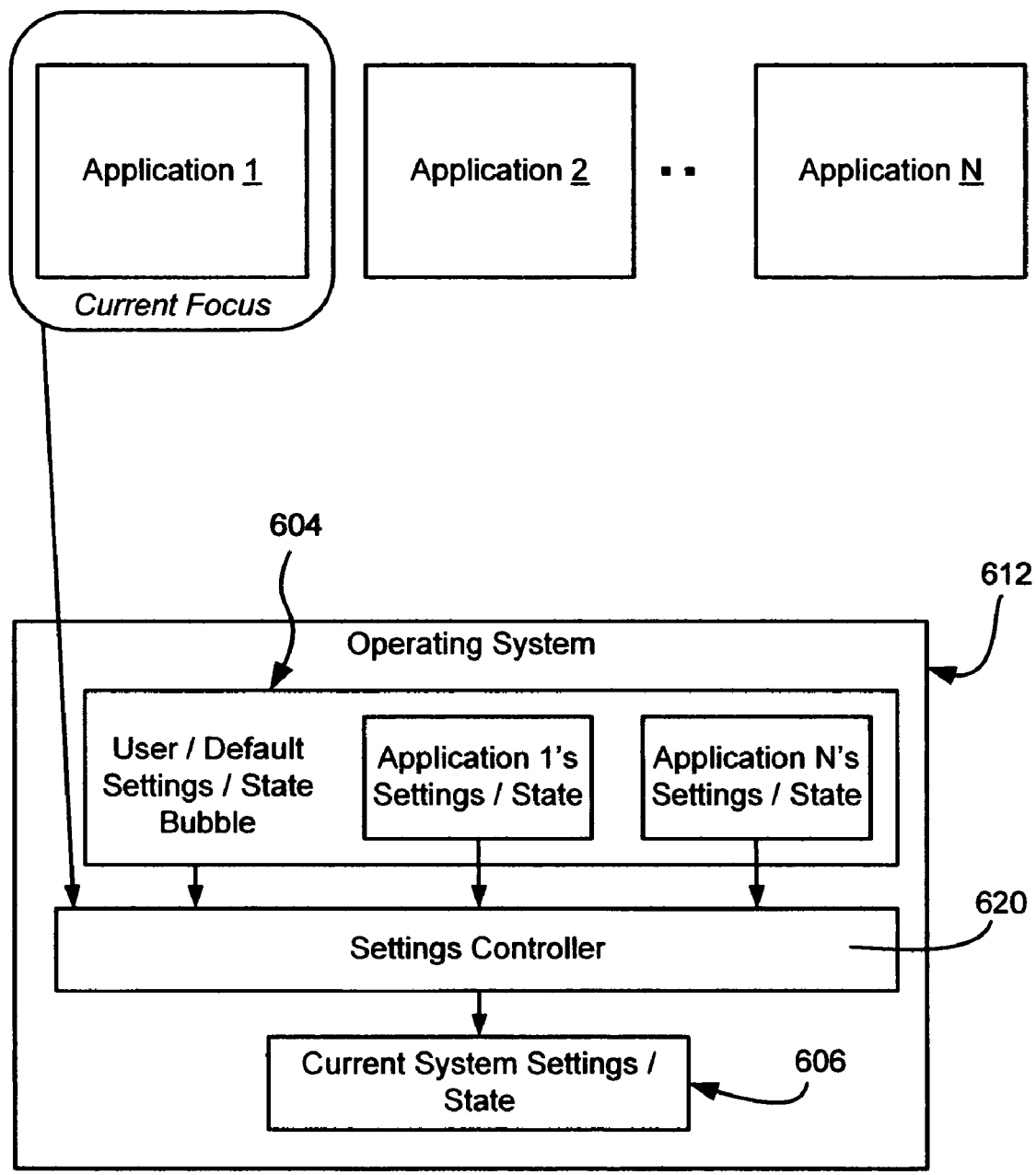
FIG. 6 is a block diagram representing a bubble that maintains system state and/or settings for multiple application programs, in accordance with various aspects of the present invention.

FIG. 6 shows an example having three or more running application programs 1–N, with one (application 1) being in a state of currently having focus. In FIG. 6, there is a user/default settings/state bubble 604 that typically exists prior to any applications being launched; this may be user-defined for certain applications as in FIG. 5, and/or get filled in with preservation information by the applications' requests for a bubble, as in FIGS. 3 and 4. In the example of FIG. 6, application 1 has at least one setting/resource state difference that exists relative to the user/default settings/resource state while application 1 has current focus. For example, application 1 may specify a different printer to be the default printer than that of the rest of the system, whereby the default printer is only changed for that application program, transiently, based on application 1 being in focus. Application N may have a different audio volume than the default audio volume, and may also turn on a projector whenever it runs, e.g., to mute volume during a presentation and only have the projector run while running the program to present images, not while switching to a note-taking program.

In the event that focus changes, the preserved user/default settings and resource state are reinstated, after preserving the settings/resource state that the application last had, so that they can be reinstated if the application later regains focus. Note that a settings controller 620 (e.g., incorporated into or associated with a window manager component) knows which application lost focus and which application gained focus, and thus which settings/resource state to preserve and restore to current settings 606, respectively. In the event that another application receives focus, the bubble may apply changes to the current system settings/state 606 on the newly-focused application's behalf, and/or the application may make the changes, as described above.

In any event, unless both applications are coincidentally making the same changes, the bubble 604 needs to restore any changes to the default/user settings when an application loses focus, and then apply any settings preserved or known for the newly-focused application, (after preserving those it will be changing). Otherwise, application 1, which changes networking-related settings for example, would receive application N's video-related changes on the next focus change.

As can be appreciated, conflict resolution is determined by the bubble 604 maintaining multiple settings, and selectively applying settings based on the various applications' states, focused or not focused. Care needs to be taken, however, to ensure that the current settings and resource states of the focused application do not cause harm by a non-focused application in the background. For example, foreground-related resources and settings such as video, volume, mouse-sensitivity (to an extent), notification suppression and the like may be changed, but background-related resources may need to be blocked. For example, while it may be possible to activate file system-based encryption/decryption by switching focus to one program, if other non-focused programs are simultaneously allowed to access files, encryption/decryption also would be applied to those background-accessed files, causing problems. Thus, focus-based bubble changes are generally limited to what can be (relatively) safely done, or the operating system needs to limit what operations non-focused applications are allowed to perform in the background while certain settings exist.

Turning to a practical example of bubble usage, consider creation of an ad hoc wireless network between previously-disconnected computers to allow file transfer and/or chat to occur between them. Changing the system network settings to connect to an ad hoc wireless network generally causes the computer to disconnect from any existing connection. Therefore, after connecting, usage and disconnecting, the network connections/settings should be changed back to what the user ordinarily needs them to be, e.g., to connect to a corporate network, or the Internet. As described above, the lifetime of the temporary network setting may be controlled by a bubble implemented specifically for wireless network settings. Note, however, that other settings unrelated to wireless networking may also be preserved in the same bubble and changed, e.g., the wallpaper or color scheme may be transiently changed during the life of the application program to alert the user of the ad hoc network being active.

To this end, via a bubble that loads upon initialization of a file transfer application, the bubble's user interface component presents an "ad hoc wireless network creation wizard" that steps the user through creating any needed wireless connection. After the connection is established, the bubble returns control back to the file transfer application/accessory. The bubble remains loaded and does nothing further until the application exits, at which time the bubble automatically restores the original settings as cached, before ending with the application process. The user is then able to again use the computer system as ordinarily needed, such as to connect to a corporate network, without having to change any settings back.

As can be seen from the foregoing detailed description, there is provided a method and system that preserves state changes to resource and settings, and restores them based on the state of an application program. Changes may be initiated by the application that needs them or on its behalf, and restoration of original state occurs essentially without further action from the application to reset the changes. The present invention thus controls the lifetime of a system resource/setting change in a manner that is robust, encapsulated, and easy to use. The notion that these setting(s) are contained in a "bubble" is also unique to this invention. Changes can involve wizards or other UI to implement the change, multiple changes can be encompassed in a single bubble, the actual change can be determined at application runtime (e.g., based on application heuristics), and no special system support is required, because the invention is operating system independent. The present invention thus provides numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing system that includes an operating system and a plurality of applications that share a common, system-wide set of settings, such that when the settings are established, the settings apply equally to each of the operating system and the plurality of applications, a method for enabling a particular application to change one or more settings while preserving an original state of the system-wide, shared settings and ensuring that changes are reverted to the original state when the particular application exits, comprising:

creating a bubble to maintain original state data of at least one system setting, the at least one system setting being shared between multiple applications such that the at least one system setting applies to each of the multiple applications using a corresponding resource affected by the at least one system setting;

in conjunction with execution of program code of an application program of the multiple applications, receiving a request to change the original state data of the at least one system setting;

preserving the original state data of the at least one system setting via code of the bubble, wherein preserving the at least one system setting includes storing a value corresponding to the original state data;

changing the at least one system setting such that the original state data is changed to amended state data; and automatically, and upon exit of the application program that requested change of the original state data, restoring, via code of the bubble, the state data of the at least one system setting from the amended state data back to the original state data as it existed prior to execution of the program code of the application program, and such that reversion from amended state data back to original state data of the at least one setting is performed independent of, and without involving, the application program.

2. The method of claim 1 wherein creating the bubble comprises loading a dynamic link library into a process space of the application program.

3. The method of claim 1 wherein creating the bubble comprises loading bubble code in a process space that is separate from a process space of the application program.

4. The method of claim 1 wherein the at least one system setting is changed via the bubble code based on a request from the application program and returning the application program to execution.

5. The method of claim 1 wherein restoring the state data comprises detecting that the application program is ending.

6. The method of claim 1 wherein the state data of the at least one system setting is specified by the application program requesting changes.

7. The method of claim 1 wherein the state data of at least one system setting is inferred automatically by the bubble code based on at least one system setting change requested by the application program.

8. The method of claim 1 wherein restoring the state data of the at least one system setting comprises detecting that the application program has lost focus.

9. The method of claim 1 wherein preserving the original state data via code of the bubble comprises preserving data corresponding to at least one element of a system settings set, containing, network/modem-related data, display-related data, screensaver-related data, notification-related data, printer-related data, registry-related data, file system-related data, desktop-related data, system tray-related data, keyboard-related data, port-related data, system operating mode-related data, language-related, privilege level-related, power-related data, encryption-related data, audio-related data, pointing device-related data, firewall-related data, device-related data, and start menu-related data.

10. At least one computer-readable storage medium having computer-executable instructions, which, when executed by a processor, cause a computing system to perform the method of claim 1.

11. In a computing environment, a system comprising:
a processor;
one or more computer-readable storage media storing computer-executable instructions that, when executed by the processor, cause the system to perform a method for preserving a system-wide setting by restoring the system-wide setting automatically, upon termination of an application program, to a value used by the system before a change requested by the application program, the computer-executable instructions including instructions to:
access a bubble means created to maintain an original setting value, the original setting value being shared between multiple applications such that the at least one system setting applies to each of multiple applications using a resource corresponding to the original setting value;
in conjunction with execution the application program, receiving a request to change the original system setting to an altered system setting;
using the bubble means, preserving the original system setting, the preserved original system setting including a value corresponding to the original system setting;
changing the original system setting such that the original system setting is changed to the altered system setting; and
automatically, and upon exit of the application program that requested change of the original system setting, and using a bubble controlling means, restoring the original system setting from the altered system setting back to the original system setting as it existed prior to execution of the application program, and such that reversion from altered system setting back to original system setting is performed independent of, and without involving, the application program.

12. The system of claim 11 wherein the bubble comprises a dynamic link library loaded into a process space of the computer program.

13. The system of claim 11 wherein the bubble executes in a process space that is separate from a process space of the computer program.

14. The system of claim 11 wherein the first and second mechanisms comprise code associated with the computer program.

15. The system of claim 11 wherein the bubble preserves the original state data that corresponds to at least one element of a system settings set, the set containing, network/modem-related data, display-related data, screensaver-related data, notification-related data, printer-related data, registry-related data, file system-related data, desktop-related data, system tray-related data, keyboard-related data, port-related data, system operating mode-related data, language-related, privilege level-related, power-related data, encryption-related data, audio-related data, pointing device-related data, firewall-related data, device-related data, and start menu-related data.

* * * * *